(12) United States Patent
Kashi et al.

(10) Patent No.: US 11,472,690 B2
(45) Date of Patent: Oct. 18, 2022

(54) PNEUMATIC SYSTEM FOR FLUID MIXTURE DISPENSING DEVICE

(71) Applicant: Cana Technology, Inc., Redwood City, CA (US)

(72) Inventors: Elijah S. Kashi, San Francisco, CA (US); Kristopher Bernardo Dos Santos, San Francisco, CA (US); Andrew Scott Davies, Oakland, CA (US); Danilo Bueno, Burlingame, CA (US); Gregory Allen Springer, Los Altos, CA (US); Jeffery Lance Kizer, Oakland, CA (US); Matthew Ambauen, San Francisco, CA (US); Stephan Weidi Tai, San Francisco, CA (US); Erik James Shahoian, Sonoma, CA (US); David Friedberg, San Francisco, CA (US); Andrés Ornelas Vargas, San Francisco, CA (US); Simon Spence, Hawthorn (AU); Peter Delmenico, Hampton (AU); Andrew Christopher Jenkins, West Heidelberg (AU); Nathan Andrew Ray, Heathmont (AU)

(73) Assignee: Cana Technology, Inc., Redwood City, CA (US)

( * ) Notice: Subject to any disclaimer, the term of this patent is extended or adjusted under 35 U.S.C. 154(b) by 0 days.

(21) Appl. No.: 17/548,258

(22) Filed: Dec. 10, 2021

(65) Prior Publication Data
US 2022/0250892 A1    Aug. 11, 2022

Related U.S. Application Data

(60) Provisional application No. 63/146,461, filed on Feb. 5, 2021.

(51) Int. Cl.
B67D 1/04    (2006.01)
B01F 35/75   (2022.01)
(Continued)

(52) U.S. Cl.
CPC ............... B67D 1/04 (2013.01); B01F 33/846 (2022.01); B01F 35/1453 (2022.01);
(Continued)

(58) Field of Classification Search
CPC ... B67D 1/04; B67D 1/0425; B01F 35/71745; B01F 35/2213
See application file for complete search history.

(56) References Cited

U.S. PATENT DOCUMENTS 3,409,175 A     11/1968  Byrne
3,622,046 A *   11/1971  Byrne ..................... B67D 1/04
                                                     222/136
(Continued)

FOREIGN PATENT DOCUMENTS

EP    1094027 A1      4/2001
GB    2505903 A *     3/2014  ............... B67D 1/04
(Continued)

OTHER PUBLICATIONS

International Search Report dated May 11, 2022 from International Application No. PCT/US2022/011950 filed Jan. 11, 2022, 11 pages.
(Continued)

*Primary Examiner* — Elizabeth Insler
(74) *Attorney, Agent, or Firm* — Daylight Law, P.C.

(57) ABSTRACT

Fluid mixture dispensing systems, devices and methods are disclosed. A device includes a set of pressurized ingredient reservoirs, a mixing area configured to receive at least one ingredient from the set of pressurized ingredient reservoirs, a pressure source, an accumulator chamber, a set of valves, and a controller. The controller is programmed to operate the
(Continued)

set of valves to pressurize the accumulator chamber using the pressure source. The controller is further programmed to operate the set of valves to set a pressure in at least one of the set of pressurized ingredient reservoirs using the accumulator chamber.

22 Claims, 9 Drawing Sheets

(51) Int. Cl.
| | | |
|---|---|---|
| *B01F 35/71* | (2022.01) | |
| *B67D 1/00* | (2006.01) | |
| *B67D 1/07* | (2006.01) | |
| *B01F 35/10* | (2022.01) | |
| *B01F 35/21* | (2022.01) | |
| *B01F 35/221* | (2022.01) | |
| *B01F 33/84* | (2022.01) | |
| *B01F 23/40* | (2022.01) | |
| *B01F 101/14* | (2022.01) | |
| *B01F 101/16* | (2022.01) | |
| *B01F 101/21* | (2022.01) | |

(52) U.S. Cl.
CPC ...... *B01F 35/2113* (2022.01); *B01F 35/2213* (2022.01); *B01F 35/71745* (2022.01); *B01F 35/71805* (2022.01); *B01F 35/7543* (2022.01); *B67D 1/0037* (2013.01); *B67D 1/07* (2013.01); *B01F 23/483* (2022.01); *B01F 2101/14* (2022.01); *B01F 2101/16* (2022.01); *B01F 2101/21* (2022.01)

(56) References Cited

U.S. PATENT DOCUMENTS

| | | |
|---|---|---|
| 6,234,349 B1 | 5/2001 | Bilskie et al. |
| 6,820,763 B2 | 11/2004 | Bilskie et al. |
| 7,007,824 B2 | 3/2006 | Danby et al. |
| 7,237,691 B2 | 7/2007 | Danby et al. |
| 9,284,174 B2 | 3/2016 | Springer |
| 10,399,841 B2 | 9/2019 | Metropulos et al. |
| 10,858,232 B2 * | 12/2020 | Carpenter ............ B67D 1/0888 |
| 11,091,360 B2 | 8/2021 | Christiansen |
| 2010/0049362 A1 | 2/2010 | Hatuka |
| 2010/0145522 A1 | 6/2010 | Claesson et al. |
| 2010/0176147 A1 * | 7/2010 | Segers ................ B67D 1/0837 222/1 |
| 2015/0210522 A1 * | 7/2015 | Jersey ................ B67D 1/0044 222/134 |
| 2016/0297663 A1 | 10/2016 | Zemko |
| 2017/0225936 A1 | 8/2017 | Jersey et al. |

FOREIGN PATENT DOCUMENTS

| | | |
|---|---|---|
| WO | 2016057869 A1 | 4/2016 |
| WO | 2017180660 A1 | 10/2017 |

OTHER PUBLICATIONS

International Search Report dated Jul. 5, 2022 from International Application No. PCT/US2022/011950 filed on Jan. 11, 2022, 21 pages.

* cited by examiner

PNEUMATIC SYSTEM FOR FLUID MIXTURE DISPENSING DEVICE

CROSS REFERENCE TO RELATED APPLICATIONS

This application claims the benefit of U.S. Provisional Patent Application No. 63/146,461 filed Feb. 5, 2021, which is incorporated by reference herein in its entirety for all purposes.

BACKGROUND

Typical beverage dispensing systems combine a diluent (e.g., water) with a basic beverage component such as concentrates or syrups made up of a multitude of other ingredients. However, these basic beverage components often require significant storage space and may even need to be kept refrigerated in order to protect against spoilage. Accordingly, these basic beverage components are most likely not even stored in the same room as the dispenser, much less in the dispensing container itself. In addition, each individual beverage may require its own unique basic beverage component thereby further increasing storage space and the overall footprint of the beverage dispensing system. Furthermore, typical beverage dispensing systems cannot allow for customization of the beverage as well as household usage.

SUMMARY

This disclosure relates generally to fluid mixture dispensing systems, devices and methods, and more specifically, to pneumatics for fluid mixture dispensing systems, devices and methods.

According to an aspect, fluid mixture dispensing can be accomplished by an all-in-one automated fluid mixture dispensing system. The system can generate mixtures of beverages, cleaning products, cosmetic compounds, and various other fluid mixtures. Based on a user selection that can be custom tailored by them, the system can prepare and dispense a variety of fluid mixtures, based on a set of basic mixtures and compounds. The system can rely on the predefined chemical makeup of the fluid mixture in order for the system to prepare the mixture. For example, chemical analysis of a specific wine or perfume results in a list of chemical ingredients or components that make up the specific wine or perfume. The systems disclosed herein can rely on that predetermined list of chemical ingredients for a specific final, user specified fluid mixture (e.g., chardonnay) to prepare that fluid mixture. Some chemical ingredients may be dispensed in the final mixture with relatively large volume percentages (e.g., a glass of wine may have about 10-15% ethanol), whereas other components may be dispensed in volume of less than 0.1 mL.

Accordingly, rather than forming a fluid mixture from concentrates or syrups, the system disclosed herein can form the fluid mixtures based on predetermined amounts of individual chemical ingredients that make up the fluid mixture allowing for a level of customization and choice not available to current beverage systems today. Because a small quantity (e.g., less than 0.1 mL) of an individual chemical ingredient can have a large effect on a fluid mixture property (e.g., taste), the overall storage or footprint of the system can be significantly smaller than those dispensing system that which rely on syrups and/or concentrates.

FIG. 1 illustrates an example of a fluid mixture dispensing system in the form of a device 100, in accordance with specific embodiments of the invention. Image 150 illustrates an example of the external appearance of the device 100 and image 160 illustrates an example of some of the internal components that can be part of the device 100. In some embodiments, the fluid mixture dispensing device 100 can be used for beverage dispensing as well as a wide variety of other fluid mixture dispensing. The fluid mixture dispensing device 100 can be a countertop or consumer electronic device or a larger device installed in a restaurant or other commercial business.

Fluid mixture dispensing device 100 can include a casing 102. The casing can be a protective outer casing that houses various internal components of the system, such as the components illustrated in image 160. These internal components can include solvent reservoir(s) (e.g., water reservoir(s) and/or alcohol reservoir(s)) such as solvent reservoirs 108a and 108b, ingredient reservoirs such as ingredient reservoirs 106, a cartridge for the ingredient reservoirs, such as cartridge 105, mixing channels, mixing chambers, heat exchangers (e.g., heaters/chillers), and/or dissolution chamber(s) as well as various fluid moving mechanisms (e.g., valves, actuators, pumps, etc.). Fluid mixture dispensing system 100 can also include a user interface 103 so that a user can control the device. For example, a user can select a beverage to be made by device 100 via the user interface 103. Fluid mixture dispensing system 100 can also include one or more controllers configured to execute instructions to control the various components of the device and to cause the device to perform the functions described in this disclosure.

FIG. 2 illustrates a block diagram 200 of exemplary components of a fluid mixture dispensing device, such as fluid mixture dispensing device 100 of FIG. 1. Block diagram 200 includes the components illustrated with reference to FIG. 1 and additional exemplary components of the system, and possible connections between them, in accordance with specific embodiments of the invention.

As illustrated in FIG. 2, the system 100 can include an air pressure generation and storage module 250. In specific embodiment of the invention, module 250 can be a pneumatic system for the device 100 and include a pressure source for pressure generation and a pressure storage for storing such pressure. In specific embodiments of the invention, the pressure storage is an accumulator chamber.

In specific embodiments of the invention, the pneumatic system can be utilized to maintain pressure in a pressurized cartridge/chamber, such as ingredient cartridge 105 or at least one of the ingredient reservoirs 106. In addition, air from the pneumatic system can be used as a purge for a flow line, mixing area, mixing chamber, dissolution chamber, and/or a mixing channel so that there is no left-over ingredient, solvent, or solvent mixture prior to starting the next fluid mixture. In addition, air from the pneumatic system can be used to help dispense solvent and/or an ingredient from reservoirs. Alternatively, or in combination, air from the pneumatic system can be used to control a pneumatic valve to control flow or help eject a cartridge. In specific embodiments of the invention, the pressure from the pressure source can be stored in the accumulator chamber, so that the accumulator chamber can provide pressure to the system without the need of having the pressure source working every time pressure is needed in the system.

In specific embodiments of the invention, a fluid mixture dispensing device is provided. The devices comprises a set of pressurized ingredient reservoirs, a mixing area configured to receive at least one ingredient from the set of pressurized ingredient reservoirs, a pressure source, an accumulator chamber, a set of valves, and a controller. The controller is programmed to operate the set of valves to: pressurize the accumulator chamber using the pressure source; and set a pressure in at least one of the set of pressurized ingredient reservoirs using the accumulator chamber.

In specific embodiments of the invention, a method of operation for fluid mixture dispensing device is provided. The method comprises pressurizing, using a pressure source, an accumulator chamber. The method also comprises dispensing at least one ingredient from a set of pressurized ingredient reservoirs to a mixing area. The method also comprises setting a pressure in at least one of the set of pressurized ingredient reservoirs using the pressure in the accumulator chamber.

In specific embodiments of the invention, a fluid mixture dispensing device is provided. The device comprises a mixing area, at least one solvent reservoir, a pneumatic system, a solvent pump, and a three-way valve fluidly connected to the at least one solvent reservoir, the mixing area, and the pneumatic system. The solvent pump moves a solvent from the at least one solvent reservoir towards the three-way valve. The pneumatic system moves the solvent through the mixing area.

BRIEF DESCRIPTION OF THE DRAWINGS

In the Figures, like reference numbers correspond to like components unless otherwise stated.

DETAILED DESCRIPTION

Figure 1:
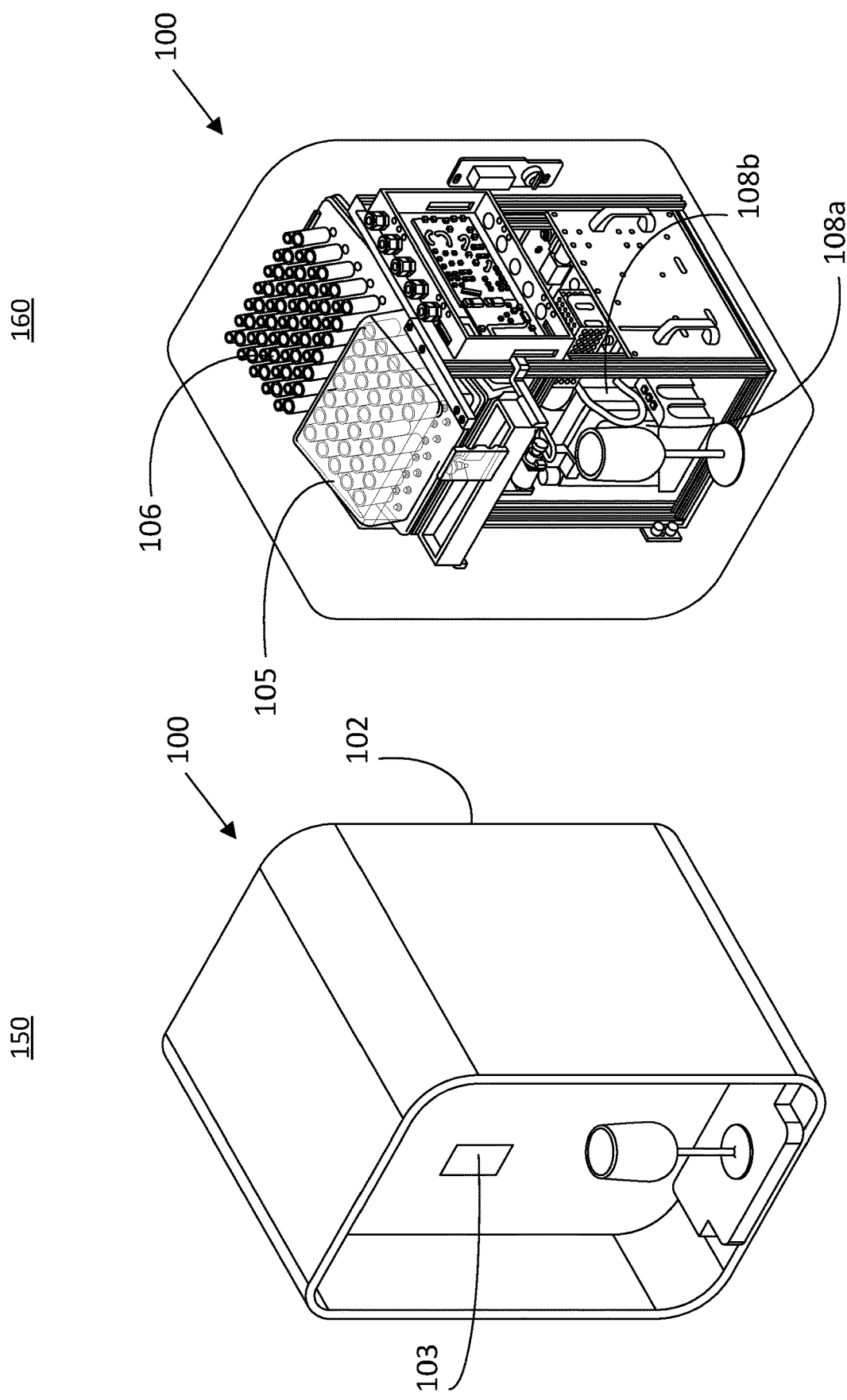
FIG. 1 illustrates an example of a fluid mixture dispensing system, in accordance with specific embodiments disclosed herein.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different components and methods for a fluid mixture dispensing system such as device 100 illustrated in FIG. 1 and FIG. 2 will be described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

As illustrated with reference to FIG. 1 and FIG. 2, the fluid mixture dispensing device 100 can include one or more ingredient reservoirs, such as ingredient reservoir 106. The ingredient reservoirs can be any of the ingredient reservoirs described in U.S. Provisional Patent Application No. 63/146,461 filed Feb. 5, 2021, U.S. patent application Ser. No. 17/547,081 filed Dec. 9, 2021, and U.S. patent application Ser. No. 17/545,699 filed Dec. 8, 2021, all of which are incorporated by reference herein in their entirety for all purposes.

An ingredient reservoir can include an "ingredient" also referred to herein as an "ingredient mixture". An ingredient mixture can include at least one primary/functional ingredient. A primary/functional ingredient can be at least one of a solid, liquid, or a gas. An example of a primary/functional ingredient can be chemical compounds.

In some embodiments, the ingredient mixture can include various concentrations of chemical compounds. In some embodiments, an ingredient mixture can include at least one solvent. The at least one solvent can be any combination of solvents disclosed herein. For example, an ingredient mixture in an ingredient reservoir can be a mixture of citric acid (primary/functional ingredient) and water at a particular concentration. Another ingredient mixture can be a mixture of potassium sulfate (primary/functional ingredient), water, and ethanol. As discussed herein, these ingredients/ingredient mixtures can get dispensed into a fluid stream (which could be a mixture in itself of solvent (e.g., water and/or ethanol)) and combined together to form an intermediate fluid mixture. In some embodiments, an ingredient mixture can also include at least one of a solvent (e.g., water and/or an alcohol) and an additive ingredient. An additive ingredient can be at least one of a surfactant, preservative, or an emulsifier/stabilizer.

Ingredient or ingredient mixtures can be stored in ingredient reservoirs, such as ingredient reservoir 106. In some embodiments, the ingredient reservoirs can include bladder bags, syringes, gravity dispense chambers, pellet dispenser, and/or pierceable volumes. In some embodiments, the ingredient reservoirs can be the same, vary, or a combination thereof in the system. In some embodiments, the fluid mixture dispensing system can include a plurality of ingredient reservoirs.

In some embodiments, in response to receiving a request for a fluid mixture, the system can flow a predetermined amount of at least one ingredient from a plurality of ingredient reservoirs to at least one mixing channel to form an intermediate fluid mixture. An example of this is shown in FIG. 2, where in some embodiments, a predetermined amount of at least one ingredient can flow from an ingredient reservoir 106 (e.g., located within a cartridge 105) to at least one mixing channel 211. The device can include multiple mixing channels. The term mixing area will be used in this disclosure to refer to any area in which an intermediate fluid mixture is mixed including, for example one or more mixing channels in which one or more ingredients are mixed with one or more solvents. The predetermined amount of the at least one ingredient can be mixed with at least one solvent (e.g., water from a water reservoir and/or alcohol from an alcohol reservoir) in the at least one mixing channel before flowing to the mixing chamber. The at least one solvent can dissolve the at least one ingredient and/or carry the at least one ingredient to the mixing chamber.

Figure 2:
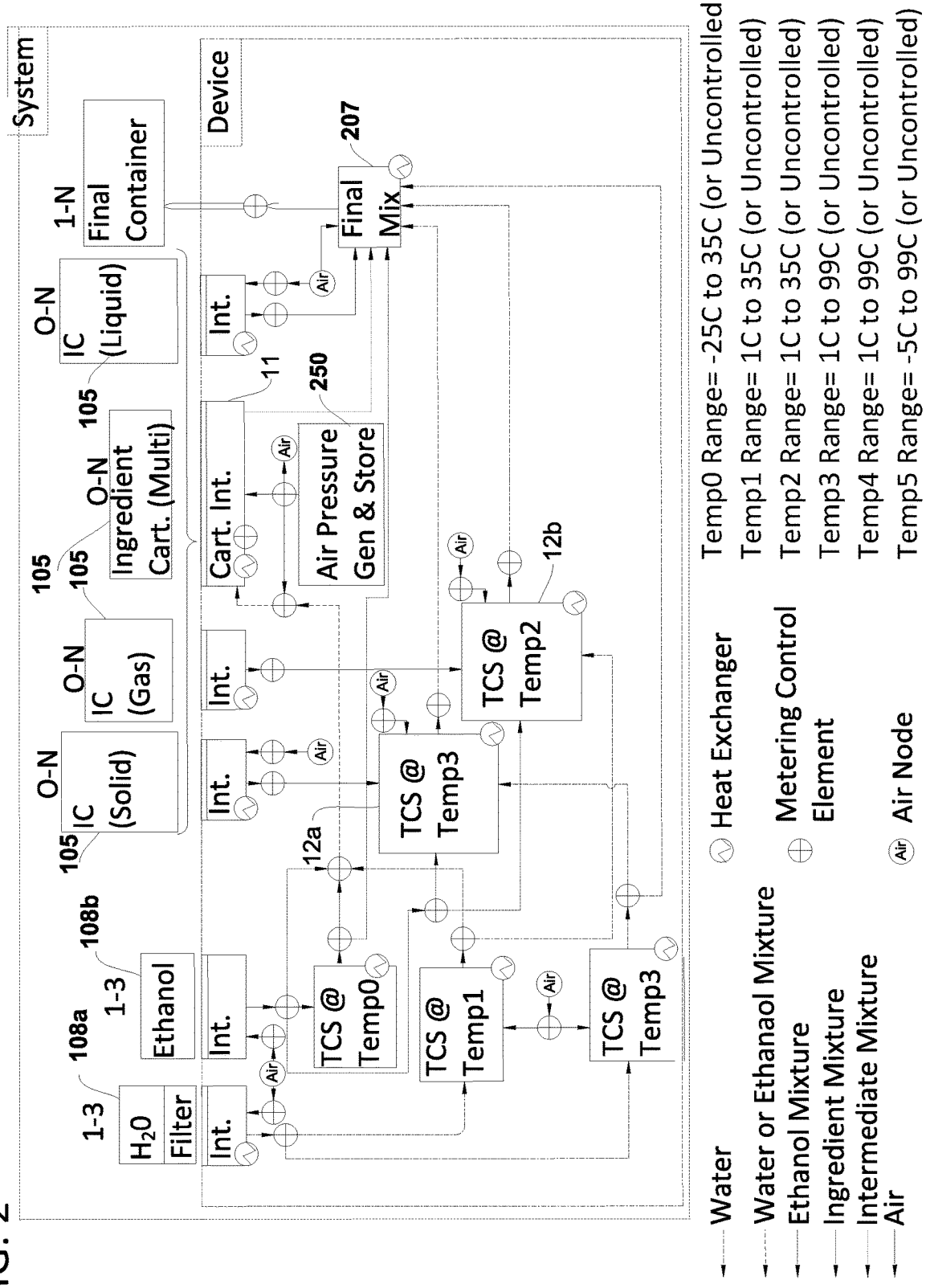
FIG. 2 illustrates a block diagram including exemplary components of a fluid mixture dispensing device in accordance with specific embodiments disclosed herein.

As illustrated in FIG. 2, in some embodiments, in response to receiving a request for a fluid mixture, the system can flow a predetermined amount of at least one ingredient from at least one ingredient reservoir to other parts of the system, such as the mixing chamber 207, or to at least one dissolution chamber to form an intermediate mixture, such as solid dissolution chamber 12a and gas dissolution chamber 12b. In some embodiments, the at least one ingredient reservoir that is configured to flow an ingredient directly to the mixing chamber 207 and/or dissolution chambers may not be one of the ingredient reservoirs that is fluidly connected to the at least one mixing channel as shown in FIG. 2.

In some embodiments, the predetermined amounts of the ingredient(s) can be specific to the requested fluid mixture. In other words, the predetermined amounts of the ingredient(s) that is flowed to the mixing chamber whether it be flowed directly there or in an intermediate mixture or mixtures from a mixing area can correspond to the amount of the ingredient(s) in a predefined fluid mixture, for example a fluid mixture selected form a library of predefined fluid mixtures.

In some embodiments, a predetermined amount of an ingredient from an ingredient reservoir can be dispensed via at least one microfluidic pump into a mixing area including at least one mixing channel, or into the mixing chamber, and/or at least one dissolution chamber. In some embodiments, every ingredient reservoir can be fluidly connected to a microfluidic pump for dispensing an ingredient in an ingredient reservoir to a mixing channel, the mixing chamber, and/or at least one dissolution chamber. In some embodiments, multiple ingredient reservoirs can be fluidly connected to a microfluidic pump for dispensing ingredients from the ingredient reservoirs.

The ingredient reservoirs can be provided in one or more cartridges, such as cartridge 105. The cartridge can include a pressurized chamber to keep the ingredient reservoirs under pressure and facilitate dispense of such ingredients. The cartridge can be any of the cartridges described in U.S. Provisional Patent Application No. 63/146,461 filed Feb. 5, 2021, U.S. patent application Ser. No. 17/547,081 filed Dec. 9, 2021, U.S. patent application Ser. No. 17/547,612 filed Dec. 10, 2021, and U.S. patent application Ser. No. 17/545,699 filed Dec. 8, 2021, all of which are incorporated by reference herein in their entirety for all purposes.

FIG. 1 and FIG. 2 show a set of ingredient reservoirs, such as ingredient reservoirs 106, packaged in an ingredient cartridge 105. In some embodiments, the system can include one or more ingredient cartridges. For example, FIG. 2 shows at least one of 0-N solid ingredient cartridges, 0-N gaseous ingredient cartridges, 0-N multi-ingredient cartridges, and 0-N liquid ingredient cartridges. In some embodiments, an ingredient cartridge 105 can include a plurality of ingredient reservoirs 106.

In some embodiments, at least one cartridge can be configured to dispense a predetermined amount of the at least one ingredient from at least one ingredient reservoir to a mixing area (including one or more mixing channels), the mixing chamber, and/or at least one dissolution chamber. In some embodiments, the at least one cartridge can be removably attached from the fluid mixture dispensing system so that it can be replaced, serviced (ingredients refilled/replaced) and recyclable. In some embodiments, the fluid mixture dispensing system can still operate with a cartridge missing or empty.

In some embodiments, a predetermined amount of at least one ingredient can be dispensed via at least one valve into the mixing area, the mixing chamber, and/or at least one dissolution chamber. In some embodiments, each ingredient reservoir can have an individual valve and actuator. In some other embodiments, more than one ingredient reservoir can be associated to the same valve and/or actuator. In some embodiments, each valve can be configured to control the flow of an ingredient from an ingredient reservoir to the mixing area, the mixing chamber, and/or at least one dissolution chamber.

In some embodiments, the at least one cartridge, such as cartridge 105, can include a pressurized chamber inside the cartridge. In specific embodiments, the pressurized chamber can be formed by the cartridge itself. This pressurized chamber can house the plurality of ingredient reservoirs, such as ingredient reservoir 106, such that a pressure can be applied to the ingredient reservoirs. In some embodiments, the system (e.g., a controller, a pressure regulator, or other elements as will be described below in more detail) can be configured to control the pressure of the pressurized chamber. Accordingly, the cartridge can be pressurized such that when the valve of an ingredient reservoir is opened, the ingredient stored in that ingredient reservoir can flow out of the ingredient reservoir towards a mixing channel, the mixing chamber, and/or at least one dissolution chamber. The ingredient reservoirs can be loaded into or attached to the pressurized chamber with a controlled pressure for providing an expulsion force.

The mixing area (including one or more mixing channels), the mixing chamber, and/or at least one dissolution chamber can be fluidly connected to the valve outputs of the ingredient reservoirs such that any valve opening can result in an ingredient flowing to a mixing area (including one or more mixing channels), the mixing chamber, and/or at least one dissolution chamber. In some embodiments, the controller can be configured to open at least one valve for a time based on at least the pressure of the pressurized chamber, the physical flow characteristics of the specific ingredient in the ingredient reservoir, and/or the diameter of the at least one valve opening to control the flow of the predetermined amount of the at least one ingredient to be dispensed. Accordingly, for a specific ingredient in an ingredient reservoir, the system can be calibrated to dispense/flow a predetermined amount of the specific ingredient to a mixing area (including one or more mixing channels), the mixing chamber, and/or at least one dissolution chamber based on the pressure of the pressurized chamber, the physical flow characteristics (e.g., viscosity) of the specific ingredient in the ingredient reservoir, and/or the diameter of the valve opening (or diameter of orifice as explained below). As such, the time interval that the at least one valve is open can proportionally correspond to amounts/concentrations of at least one ingredient of a list of ingredients of a predefined fluid mixture (from a chemical analysis). Dispensing an expected amount of an ingredient, as controlled by the time the valve is open, using the approaches disclosed in this paragraph is referred to in this disclosure as a time-based ingredient dispensing method.

In some embodiments, the ingredients stored in the ingredient reservoirs can be ported to valves beneath the ingredient reservoir. In some embodiments, the ingredient reservoirs (and their valves) can open to a mixing area (e.g., 211). In some embodiments, a plurality of ingredient reservoirs can be fluidly connected to a mixing area including a single mixing channel. In some embodiments, a mixing channel can be fluidly connected to a plurality of mixing channels and a second mixing channel can be fluidly connected to a second plurality of mixing channels. For example, a first mixing channel may have 5-20 ingredient reservoirs fluidly connected to it and a second mixing channel may have 5-20 of the same or different ingredient reservoirs fluidly connected to the second mixing channel. In those embodiments, the mixing area can include the plurality of mixing channels. Accordingly, at least one solvent (e.g., water and/or ethanol) can flow through the mixing area and collect any ingredient dispensed into the mixing channels. In some embodiments, at least one solvent can also be dispensed into the mixing area in order to remove any leftover ingredients.

In some embodiments, the mixing channel(s) can be formed into the bottom of a plate. All the mixing channels can be fluidly connected to the solvent reservoir(s) and the mixing chamber. As such, solvent can enter at least one mixing channel and at least one ingredient from at least one mixing reservoir can flow into the mixing channel to form an intermediate mixture with the solvent.

In specific embodiments of the invention, the solvents used can be water, alcohol, ethyl lactate, and/or propylene glycol. At least one solvent reservoir can supply at least one solvent to the fluid mixture to be dispensed. For example, at least one solvent reservoir 108a is shown in FIG. 1 and can be, for example, a water reservoir as illustrated in FIG. 2. In some embodiments, the fluid mixture dispensing system can include a plurality of solvent reservoirs (e.g., one or multiple water reservoirs, one or multiple alcohol reservoirs, one or multiple propylene glycol reservoirs, one or multiple ethyl lactate reservoirs, and/or mix of alcohol and water reservoirs, among other variations). In some embodiments, any water reservoir(s) can include a water filter such that the water filter can remove impurities from the water in the water reservoir(s) prior to flowing the water to the other parts of the system (e.g., mixing chamber).

The at least one solvent reservoir can supply solvent to the fluid mixture to be dispensed. For example, any water reservoir can supply water to the fluid mixture to be dispensed. In some embodiments, a solvent reservoir is a solvent container housed within the fluid mixture dispensing system to supply solvent(s) to the system. The solvent(s) can be used to dissolve or carry various other ingredients to form the requested fluid mixture. In some embodiments, in response to receiving the request fora fluid mixture, the system (e.g., a controller of the system) can flow a predetermined amount of at least one solvent from at least one solvent reservoir to at least one mixing channel to form an intermediate fluid mixture.

In some embodiments, a water reservoir is a water container housed within the fluid mixture dispensing system. In other embodiments, the water reservoir may be a standard water outlet such as a faucet or water line that can be connected to the fluid mixture dispensing system to supply water to the system. In addition, water can be used as a solvent to dissolve various other ingredients to form the requested fluid mixture. In some embodiments, in response to receiving the request for a fluid mixture, the system (e.g., a controller of the system) can flow a predetermined amount of water from a water reservoir to at least one mixing channel to form an intermediate fluid mixture. An example of this is shown in FIG. 2, where in some embodiments, a predetermined amount of water can flow to the at least one mixing channel 211 in the mixing area. The predetermined amount of water can be mixed with alcohol from an alcohol reservoir and/or ingredients (i.e., ingredient mixtures) from a plurality of ingredient reservoirs in the at least one mixing channel to form an intermediate mixture before flowing to the mixing chamber.

As illustrated in FIG. 2, in some embodiments, in response to receiving a request for a fluid mixture, the system can flow a predetermined amount of at least one solvent from at least one solvent reservoir to other parts of the system such as the mixing chamber 207. As such, the mixing chamber can be fluidly connected to a water reservoir.

The predetermined amount of the at least one solvent can be specific to the requested fluid mixture. In other words, the predetermined amounts of solvent(s) that is flowed to the mixing chamber whether it/they be directly flowed there or in an intermediate mixture or intermediate mixtures can correspond to the amount of solvent(s) in the predefined fluid mixture selected form the library of a predefined fluid mixtures. In some embodiments, the predetermined amounts of the at least one solvent can be flowed from the at least one solvent reservoir throughout the system via at least one pump.

In some embodiments, the fluid mixture dispensing system can include more than one solvent reservoir, for example a second solvent reservoir such as second solvent reservoir 108b illustrated in FIG. 1. The second solvent reservoir can be for the same or different solvent as the first solvent reservoir. In specific embodiments of the invention, the second solvent reservoir, such as 108b, can be an alcohol reservoir as illustrated in FIG. 2. In some embodiments, the fluid mixture dispensing system can include a plurality of alcohol reservoirs. The alcohol reservoir can supply alcohol to the fluid mixture to be dispensed. As stated above, the solvent reservoirs can include alcohol (e.g., ethanol), water, ethyl lactate, propylene glycol, and/or a wide variety of other alcohols and/or solvents and their various combinations. Alcohol in the alcohol reservoir can actually be an alcohol mixture. In some embodiments, the alcohol mixture can include the alcohol and water. For example, an alcohol can be an alcohol mixture of 10-100% alcohol by volume (0-90% water by volume).

In some embodiments, an alcohol reservoir(s) is an alcohol container(s) housed within the fluid mixture dispensing system. Besides supplying the alcohol to a fluid mixture, alcohol can also be used to dissolve various other ingredients to form an intermediate fluid mixture as part of the requested fluid mixture. Alcohol can also be used as a sanitizing agent for the system.

In some embodiments, in response to receiving the request for a fluid mixture, the system (e.g., a controller of the system) can flow a predetermined amount of alcohol from an alcohol reservoir to at least one mixing channel to form an intermediate fluid mixture. An example of this is shown in FIG. 2, where in some embodiments, a predetermined amount of alcohol can flow to the at least one mixing channel 211. The predetermined amount of alcohol can be mixed with water from a water reservoir and/or ingredients form a plurality of ingredient reservoirs in the at least one mixing channel to form an intermediate mixture before flowing to the mixing chamber. In some embodiments, the water and alcohol can be mixed prior to entering the at least one mixing channel.

In some embodiments, in response to receiving a request for a fluid mixture, the system can flow a predetermined amount of alcohol from an alcohol reservoir to other parts of the system such as the mixing chamber and/or a dissolution chamber such as 12*a* and 12*b*. An example of this is shown in FIG. 2, where in some embodiments, a predetermined amount of alcohol from alcohol reservoir 108*b* can flow to mixing chamber 207. As such, the mixing chamber can be fluidly connected to an alcohol reservoir and the alcohol reservoir can be fluidly connected to the at least one dissolution chamber which in turn can be fluidly connected to the mixing chamber.

The predetermined amounts of alcohol can be specific to the requested fluid mixture. In other words, the predetermined amounts of alcohol that is flowed to the mixing chamber whether it be directly flowed there or in an intermediate mixture or mixtures can correspond to the amount of alcohol in the predefined fluid mixture selected from the library of predefined fluid mixtures. For example, if a glass of Chardonnay is selected and the predefined formula for Chardonnay has 14% alcohol by volume, the system would flow predetermined amounts of ethanol to the mixing chamber to be incorporated such that the Chardonnay has 14% alcohol by volume in the final dispensed fluid mixture based on the volume of the other ingredients. In some embodiments, the predetermined amounts of alcohol can be flowed from an alcohol reservoir throughout the system via at least one pump. In some embodiments, the system (e.g., the controller) can be configured to monitor an amount of alcohol or other solvent and/or ingredients in an alcohol, solvent and/or ingredient reservoir.

Figure 3:
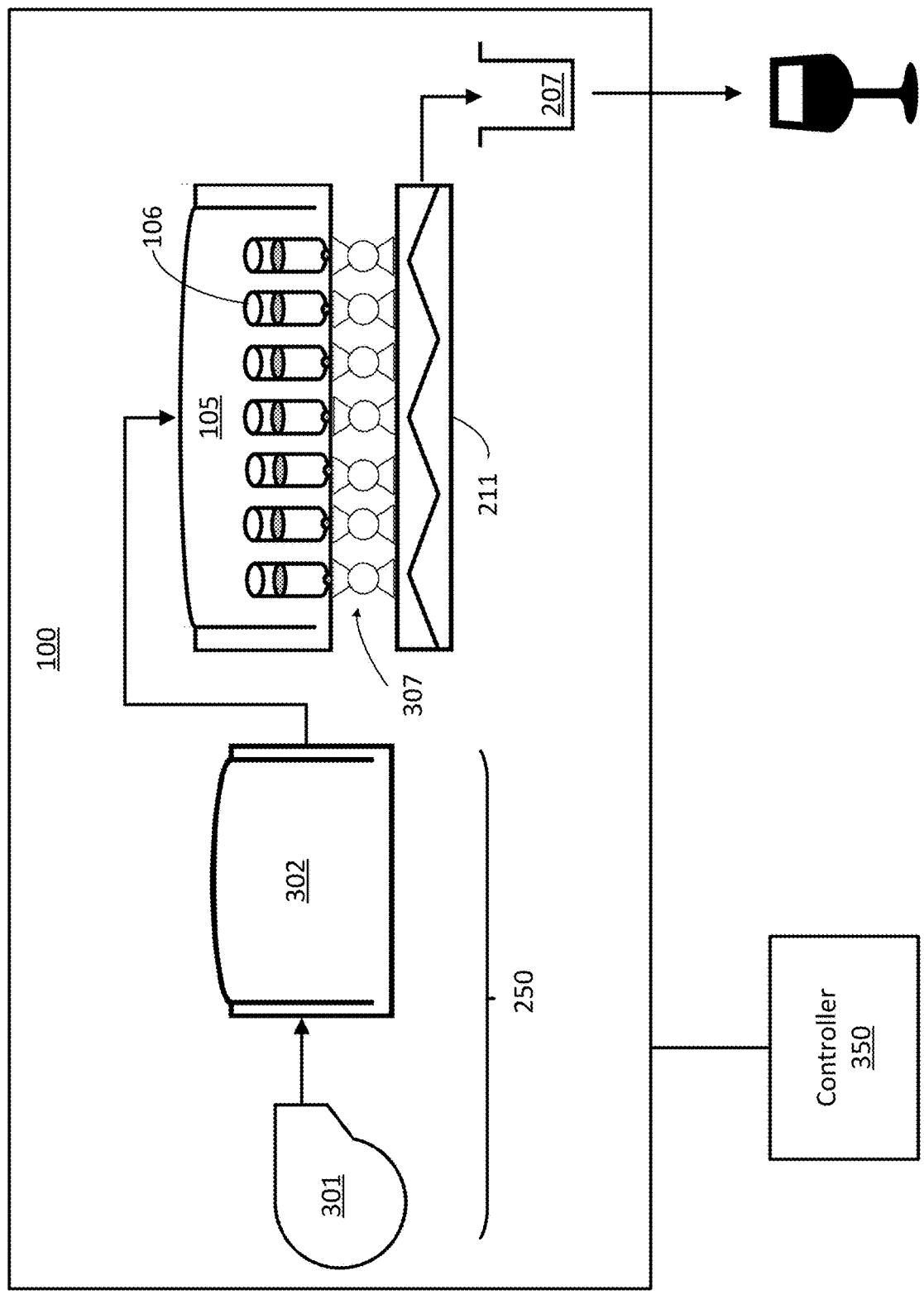
FIG. 3 illustrates a simplified block diagram including exemplary components of a fluid mixture dispensing system and a pneumatic system, in accordance with specific embodiments disclosed herein.

FIG. 3 illustrates a simplified block diagram including exemplary components of a fluid mixture dispensing system, such as fluid mixture dispensing device 100, in accordance with specific embodiments of the invention. Certain components of the device have been omitted in this figure for simplicity, such as the solvent reservoirs. However, all the components of the fluid mixing device such as the components described with reference to device 100 can be present in this example in a similar configuration as described before. The same reference numbers are being used for elements with equal or similar characteristics.

FIG. 3 illustrates a plurality of ingredient reservoirs, such as ingredient reservoir 106, in an ingredient cartridge 105. As described before, any number of ingredient reservoirs and/or cartridges can be provided in the device. Ingredient cartridge 105 can be or comprise a pressurized chamber to keep the ingredient reservoirs under pressure. FIG. 3 also illustrates a set of valves 307. The valves in the set of valves 307 can be in a one-to-one correspondence with the ingredient reservoirs so that, as explained before, each ingredient reservoir has its own valve. In specific embodiments of the invention, two or more ingredient reservoirs can be associated to the same valve. When the valves in the set of valves 307 are opened, the respective ingredients can be dispensed into the mixing area 211 as a result of the pressure in the pressurized cartridge 105. Because the valves are open to dispense the ingredients, there can be a pressure drop inside the cartridge or at least one of the ingredient reservoirs.

Specific embodiments of the invention include means for controlling and/or setting the pressure in the ingredient cartridge 105. The means for controlling and/or setting the pressure can include a pneumatic system, such as pneumatic system 250 illustrated in FIG. 2. As mentioned before, the pressure in the cartridge contributes to the dispense of the ingredients and therefore it can be convenient to maintain the pressure in the cartridge at a level that allows the dispensing effect to take place. Furthermore, when the valves in set of valves 307 are open to dispense one or more ingredients, there can be a drop in the pressure inside the cartridge 105. The pressure in the cartridge can therefore be set by the pneumatic system, such as the pneumatic system 250 of FIG. 2, so that the pressure changes within the cartridge do not interfere with the overall process of preparing a fluid mixture by the device.

FIG. 3 illustrates exemplary components of a pneumatic system such as system 250, in accordance with specific embodiments of the invention. As described before in this disclosure and further illustrated in FIG. 3, the pneumatic system can include a pressure source 301 for generating pressure for the system. The pressure source can be an air pump, a compressor, a tank of highly pressurized air, or some other source of pressure.

The pneumatic system can also include an accumulator chamber, such as accumulator chamber 302. The accumulator chamber can be used to store pressure provided by the pressure source 301 and supply such pressure to the system at a later stage, or in a more controlled manner. In the illustrated embodiment, pressure source 301 is an air pump that must be energized in order to create a pressure differential. Embodiments that utilize an accumulator chamber in combination with the pressure source can be advantageous for numerous reasons, as will be described in more detail in this disclosure. In specific embodiments of the invention, the accumulator chamber 302 works like a battery in that it stores pressure to be used by the system when a pressure source 301 is not available (e.g., when an air pump is not energized). In specific embodiments of the invention, the accumulator chamber is an intermediary between the pressure source and the components of the device that will consume such pressure so that the pressure can be provided to such components in a more controlled manner. Therefore, and as will be described below in more detail, the accumulator chamber can provide significant advantages over the use of a pressure source alone.

The accumulator chamber can be a sturdy chamber made of suitable material and dimensions. In specific embodiments of the invention, the material of the accumulator chamber can be stainless steel, plastic, titanium, aluminum, or the like. In specific embodiments of the invention the shape of the accumulator chamber can be elongated, such as a cylindrical tank, rectangular, or any other shape. The dimensions of the accumulator chamber can vary depending on the type of device (e.g., a countertop device can have a smaller accumulator chamber than a freestanding device for footprint concerns). A bigger accumulator can provide a bigger volume for storing pressure which can be advantageous in that the air pump can be off for longer periods of time. However, smaller accumulator chambers can be advantageous in that they can fit into smaller devices. In specific embodiments of the invention, the accumulator can be an off-the-shelf tank suitable for this purpose.

The accumulator can be pressurized at a target pressure level as determined by a system manufacturer and/or administrator. The pressure in the accumulator can range between a minimum threshold (e.g., 50 kPa or less) that causes the air pump to be switched to an on state, and a maximum threshold (e.g., 190 kPa or more) that causes the air pump to be switched to an off state. In specific embodiments of the invention, the accumulator is pressurized up to about 190 kPa. The table below shows measurements for an accumulator leak characterization. The accumulator leak characterization can indicate how well the accumulator is holding pressure, indicating for example how often the air pump will need to be switched on during normal operation of the device. As illustrated from the test results below, near 190 kPa a tested accumulator in a configuration commensurate in scone with the embodiments represented by FIG. 3 leaked about 2.5 kPa/min.

| Starting Pressure [kPa] | Time [m] | End Pressure [kPa] | Pressure Drop [kPa/min] |
|---|---|---|---|
| 187 | 6 | 172 | 2.5 |
| 189 | 5 | 177 | 2.4 |
| 186 | 5 | 174 | 2.4 |
| 186 | 4 | 177 | 2.25 |

Figure 4:
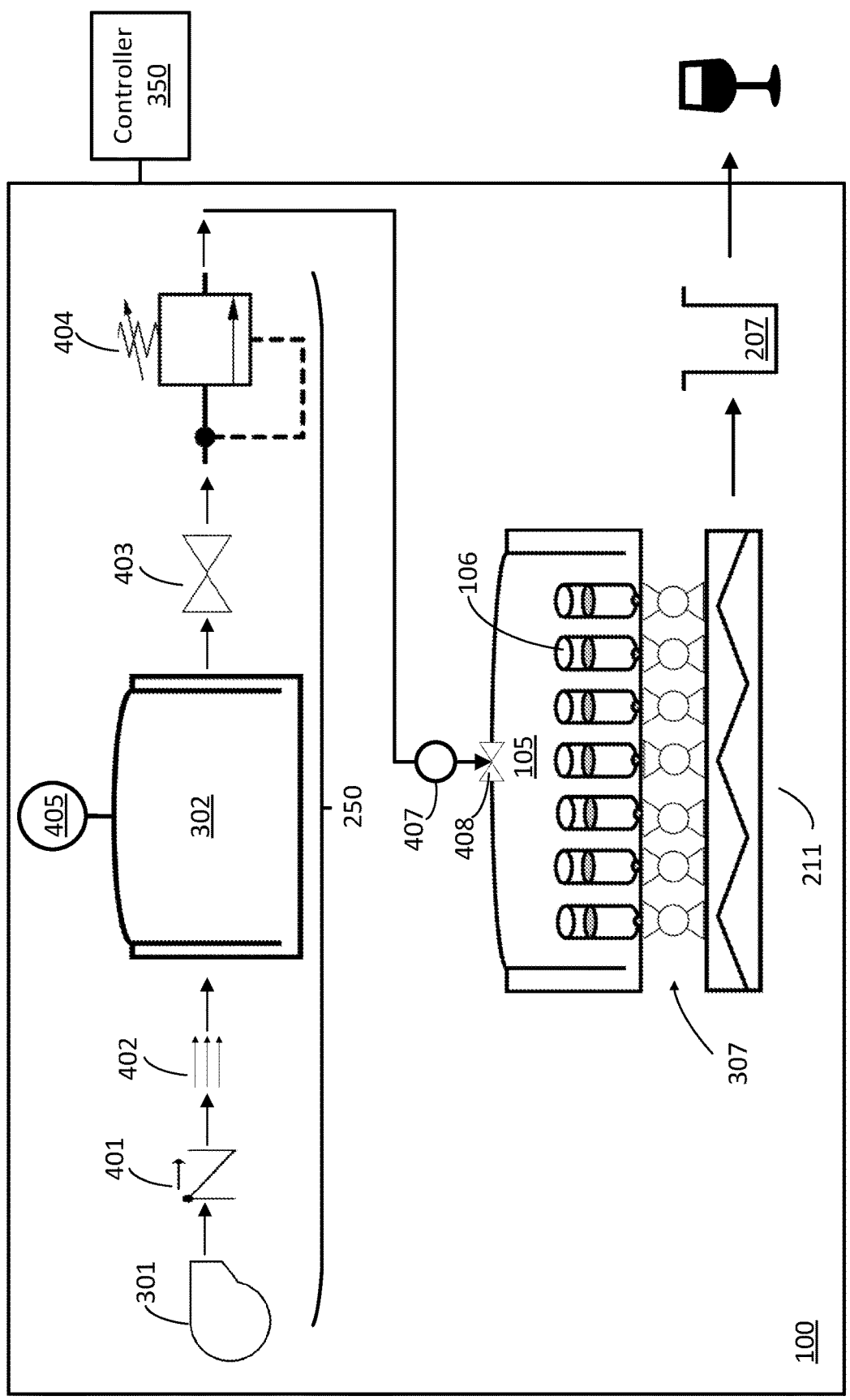
FIG. 4 illustrates a block diagram including additional exemplary components of a fluid mixture dispensing system and a pneumatic system, in accordance with specific embodiments disclosed herein.

FIG. 4 illustrates a block diagram including additional exemplary components of a fluid mixture dispensing system such as fluid dispensing system 100, in accordance with specific embodiments of the invention. As illustrated in this example, an interface between the air pump 301 and the accumulator chamber 302 can include various components. For example, the interface can include one or more valves, such as valve 401. In specific embodiments of the invention, valve 401 is a check valve. The valves can be used to control the pressure flow from the pump to the accumulator chamber. The valves can also be used to prevent backflow and therefore protect the pump 301. The interface can also include one or more filters, such as filter 402. In specific embodiments of the invention, filter 402 is an air filter. The filters can be used to prevent undesired elements from penetrating the accumulator chamber and/or the system. The filters can also be used to filter out condensation from the fluid lines. For example, an air filter can be used to filter the air so that any undesired particle such as dust can be removed before the air is used further in the system. More specific filters can be used such as purifiers to clean the air form any potential contaminant that could damage the system and/or the resulting fluid mixture. This could be of particular relevance in embodiments in which the device is used to prepare mixtures to be ingested, in which case it becomes more important that the components of the drink, including the air that can potentially be in contact with some ingredients, is clean, filtered and/or purified. This can also impact the quality and stability of the mixture created using the pneumatic system. The connection between each element can be tubing of suitable material such as stainless steel, aluminum, titanium, plastic, etc.

As also illustrated in FIG. 4, the interface between the accumulator chamber 302 and the ingredient cartridge 105 can also include various components. For example, the interface can include one or more valves, such as valve 403. The valves can be used to control the flow of pressure from the accumulator chamber to the cartridge. In specific embodiments of the invention, valve 403 is a two-way valve. In specific embodiments of the invention, the two-way valve allows blocking flow downstream of the accumulator, which can contribute to achieving higher pressures in the accumulator without pressurizing the rest of the system.

The interface between the accumulator chamber 302 and the cartridge 105 can also include one or more pressure regulators, such as pressure regulator 404. Pressure regulator 404 can control the pressure administrated to the system from accumulator chamber 302. For example, pressure regulator 404 can regulate the pressure at which the cartridge 105 and/or ingredient reservoirs 106 are pressurized. Pressure regulator can also regulate the pressure administrated to the system for other functions, such as dispensing and cleaning, as will be described below in this disclosure. Pressure regulator 404 can ensure that the pressure provided to the device is adequate and stable. In embodiments in which the pressure of the ingredient reservoirs is relied upon in order to make an accurate determination of the amount of the ingredient dispensed during a mixing operation (e.g., the time-based dispensing methods mentioned above), the pressure regulator can assure that the pressure is set to the value relied upon for the determination in order to preserve the accuracy of the determination.

The pneumatic system can also include or otherwise operate in combination with one or more sensors. The sensors can be pressure sensors that measure the pressure at different points in the system. For example, one or more pressure sensors, such as pressure sensor 405, can be located in, or otherwise be used to measure the pressure in, the accumulator chamber 302. The measurements from the pressure sensor, such as pressure sensor 405, can be used by a controller of the system, such as controller 350, to determine if the pressure in the accumulator chamber is appropriate. For example, the controller can determine, based on the measurements from the sensor, if the pressure in the accumulator chamber is below a certain minimum threshold, and in response actuate the pressure source 301 to pressurize the accumulator chamber 302, for example by switching the pump to an on state. In specific embodiments of the invention, the minimum threshold (i.e., pressure measured in the accumulator that triggers the air pump) can be a value between 50-75 kPa. The controller can also determine, based on the measurements from the sensor, if the pressure in the accumulator chamber is past a certain maximum threshold, and in response actuate the pressure source 301 to stop pressurizing the accumulator chamber 302, for example by switching the pump to an off state. In specific embodiments of the invention, the maximum threshold (i.e., pressure measured in the accumulator that turns the air pump off) can be a value between 50-190 kPa. In specific embodiments of the invention, the value can be between 80-190 kPa. In this way, the pressure in the accumulator chamber can be maintained within acceptable limits so that the storage of power for the system is available when needed. Reference values, such as the maximum and minimum thresholds mentioned before, can be stored in a memory accessible to the controller of the system so that the controller can access them and use them to compare the reference values with the values from the sensor measurements to determine if an action needs to be taken (such as turning the pump on/off, opening/closing one or more valves, etc.).

In specific embodiments of the invention, the controller can use other factors to determine when to actuate the pressure source, for example when to switch the air pump to an on/off state. For example, the controller can switch the pump to an off state based on the time the pump has been in an on state, or switch the pump to an on state when a certain amount of time has passed since the pump was last on. The controller can also or alternatively be configured to turn the pump to an off state after the pump has provided a certain amount of air/pressure to the accumulator, regardless of the pressure in the accumulator. In specific embodiments of the invention, the air pump can max out at around 190 kPa and enter a stagnation state. These and other alternative mechanisms can be used as safety measures, for example to avoid over pressurization of the accumulator chamber in case a sensor is not working correctly.

One or more pressure sensors can also be located in, or otherwise measure the pressure in, the cartridge 105 and/or at least one of the ingredient reservoirs 106. The measurements from those sensors can be used by the controller to determine if the pressure in the pressurized cartridge/reservoirs is at a target value, for example at a value that allows dispensing the ingredients from the reservoirs when the valves in the set of valves 307 are open. This target value can be stored in a memory accessible to the controller and can be set/adjusted by an operator of the system or the system itself.

As described before in this disclosure, when the valves 307 are open to dispense the ingredients from the reservoirs, the pressure in such reservoirs and/or the cartridge can drop. The controller can detect the pressure fluctuation from the measurements of a sensor such as sensor 407, and actuate the valves and components of the system so that the pressure in the cartridge/reservoir is restored and/or set to the target value. For example, the controller could actuate a valve from the accumulator chamber to the cartridge, such as valve 403, to allow pressurized air to flow to the cartridge 105. A pressure regulator, such as pressure regulator 404, can be configured to provide a pressure so that pressure in the cartridge is set to the target value. The pressure regulator 404 can also be controlled by the controller 350.

The ingredient cartridge 105 can include a least one inlet valve, such as valve 408, to control the inlet flow from the pneumatic system. The inlet valve can also be controlled by the controller 350 so that it can be actuated automatically, and used in combination with the sensors and pressure regulators described herein. For example, when the pressure inside the cartridge 105/ingredient reservoirs 106 drops below a certain level, the inlet valve can be open to allow pressure from the pneumatic system into the cartridge. After the pressure in the cartridge reaches a target level, the inlet valve can be closed. The pressure levels can be determined via pressure sensors in the cartridge, such as sensor 407.

The pneumatic system can provide pressure to the system for various purposes. As explained before with reference to FIG. 3 and FIG. 4, the pneumatic system can be used to provide pressure to the system to keep the ingredient cartridge 105/reservoirs 106 pressurized. As another example, the pneumatic system can be used to force air into some areas of the system. The forced air can be used, for example, to move content, such as ingredients and mixtures within the system. The forced air can also be used for a cleaning procedure. For example, the forced air can be used after a mixture was dispensed out of the mixing area, to remove left-overs in the channels after a mixture was prepared. This can be of particular relevance for fluid mixtures that do not use the same solvent/ingredients in that the solvent from a previous mixture can be removed before a next mixture is prepared. The forced air can be used to move a cleaning agent thought the channels. The cleaning agent can be a solvent from the solvent tank, such as alcohol, and the process can be the same as dispensing alcohol for a mixture. The forced air can be used to blast air, water, or any other substance to rinse and clean the mixing area.

The systems disclosed herein can dispense air at various points (via various air nodes) throughout the system as shown in FIG. 2. As explained, air can be utilized to maintain pressure in the pressurized cartridge, such as the ingredient cartridge 105 and/or ingredient reservoirs 106. In addition, air can be used as a purge for a flow line, mixing area, mixing chamber, dissolution chamber, and/or a mixing channel so that there is no left over solvent or solvent mixture prior to starting the next fluid mixture. In addition, air can be used to help dispense solvent and/or an ingredient from an ingredient reservoir. The air can also be used to control a pneumatic valve to control flow or help eject a cartridge.

Figure 5:
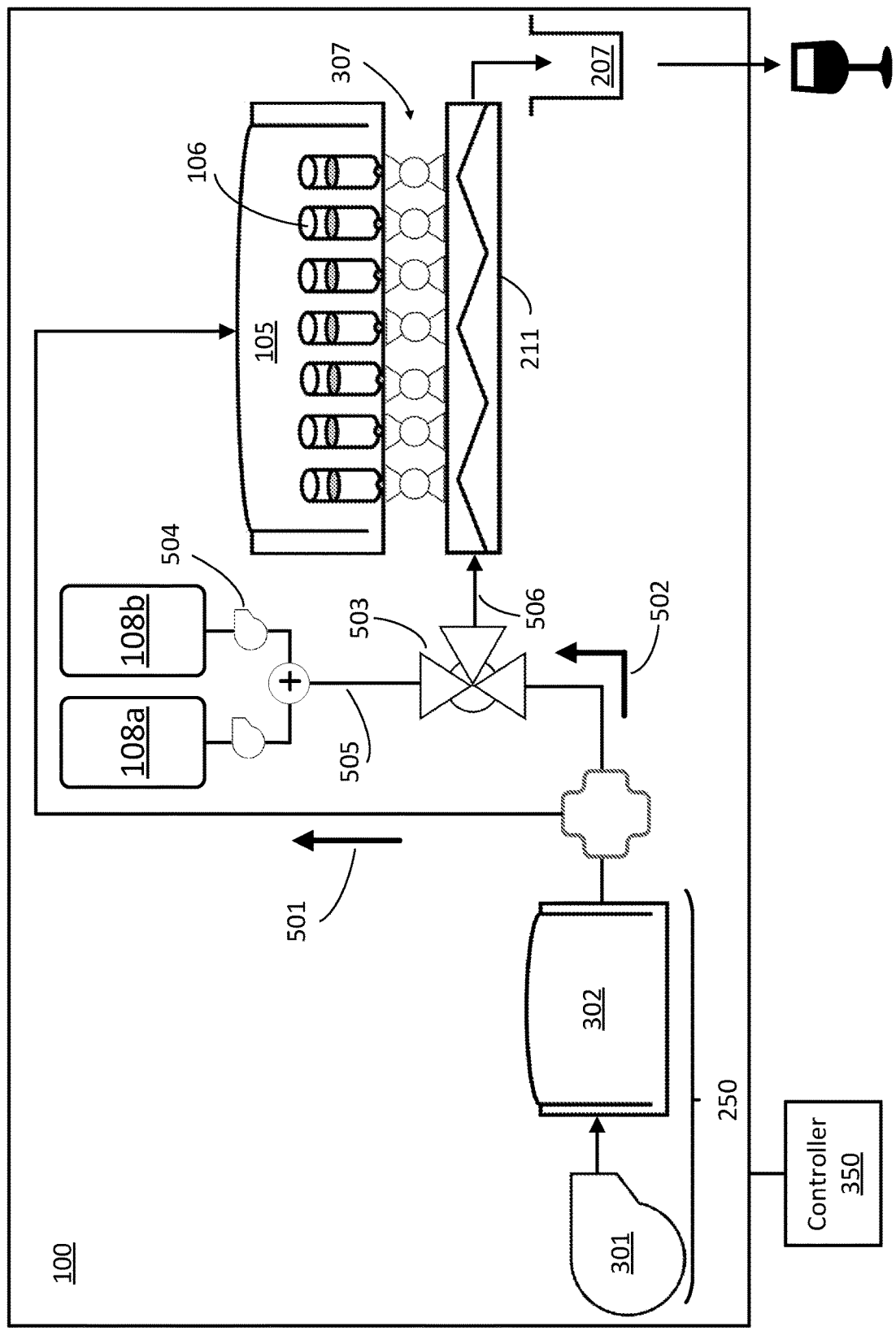
FIG. 5 illustrates a block diagram including additional exemplary components of a fluid mixture dispensing system with various pressure channels, in accordance with specific embodiments disclosed herein.

FIG. 5 illustrates a block diagram including additional exemplary components of a fluid mixture dispensing system, such as fluid mixture dispensing system 100, with various pressure channels for various purposes, in accordance with specific embodiments of the invention. This example illustrates how the pressure/air from the pneumatic system can be used not only to pressurize the cartridge 105/reservoirs 106, but also to provide air to other parts of the system for other purposes. The components of the pneumatic system 250 can be the components previously described with reference to FIGS. 1-4.

In the example of FIG. 5, the cartridge 105/reservoirs 106 can be pressurized via a first channel 501 in the manner described with reference to FIGS. 1-4. Additional pressure channels, that lead to other parts of the system, can be derived from the pneumatic system. FIG. 5 illustrates at least one second pressure channel 502 from the pneumatic system (for example from the accumulator chamber) to a three-way valve 503. The different channels can be split from a common channel and can include at least one valve that is common to all the channels, such as valve 403 (described with reference to FIG. 4) which is common to channels 501 and 502, and can include one or more valves exclusive to each of the channels separately. For example, the three-way valve 503 can be exclusive to the second channel and does not need to be related to the pressurization of the cartridge 105/reservoirs 106. In the same way, valve 408 (described with reference to FIG. 4) can be exclusive to the pressurization of the cartridge 105/reservoirs 106 via channel 501 and does not need to be related to channel 502. The channel split can serve to pressurize the cartridge (105) or to allow pressurized air to flush the channel (air purge/flush) after a dispense or during a normal cleaning cycle. The functionality can be dependent on the pressurization states of the surrounding two- and three-way valves.

The three-way valve 503 can be connected to the mixing area 211 and to one or more solvent reservoirs such as reservoirs 108a and 108b. The three-way valve 503 can be connected to the mixing area 211 via an inlet line 506 and to at least one solvent reservoir via at least one solvent line 505. The three-way valve 503 can allow a flow of solvent from the one or more solvent reservoirs into the mixing area 211 in a first configuration via the inlet line 506. In this configuration, inlet line 506 can be a solvent inlet line. As used in this disclosure, solvent line 505 can be an upstream solvent line in that it is connected upstream of the three-way valve, and inlet line 506 can be a downstream solvent line in that it is connected downstream of the three-way valve. The mixing area 211 can include at least a portion of line 506. In this way, ingredients from the ingredient reservoirs 106 can be dispensed directly into the solvent line 506.

The three-way valve 503 can allow the passage of air from the pneumatic system (e.g., from the accumulator chamber) in a second configuration. In this configuration, inlet line 506 can be an air inlet line. In this way, air from the pneumatic system can be forced into the mixing area 211 via the three-way valve 503. The air can be used to move the mixture in the mixing area 211 throughout the mixing area, for example to agitate the mixture or to dispense it out of the mixing area. The mixture could be dispensed out of the mixing area into a mixing chamber or final dispense chamber 207. The air can also be used to clean the mixing area once a mixture has been mixed there, for example by forcing air into the channels to remove the mixture left-overs.

As described, the three-way valve can allow solvent from the solvent reservoirs such as 108a and 108b to flow through and form a solvent flow through the mixing area 211. In specific embodiments of the invention, the solvent flow is provided via one or more solvent pumps 504 that allow solvent from the solvent reservoirs into the mixing area 211, via the three-way valve 503. In specific embodiments of the invention, the solvent flow can contain solvent from a single solvent reservoir. In specific embodiments of the invention, the solvent flow can contain solvent from a combination of solvent reservoirs, such as 108a and 108b. In this case, a mixed solvent line 505 can be connected upstream of the three-way valve 503. The one or more solvents can be dispensed into such mixed solvent line and the three-way valve can provide the solvent flow (mixed or not) in a downstream solvent flow to the mixing area. The ingredients from the ingredient reservoirs 106 can then be dispensed directly into the solvent flow in the mixing area 211 to form a mixture. This mixture can be an intermediary mixture and be further mixed/combined with other ingredients in other parts of the system, such as a mixing chamber or final dispense chamber 207.

In specific embodiments of the invention, the solvent flow through the three-way valve 503 and into the mixing area 211 can be stopped before or while the ingredients from the ingredient reservoirs 106 are being dispensed into the solvent flow. The solvent flow can be stopped by turning the solvent pump(s) 504 to an off state, by turning the three-way valve 503 to an alternate configuration that does not allow such flow, or by controlling any other valves and components of the system. In this way, the solvent flow can be held in the mixing area 211 for a period of time while one or more ingredients are dispensed from one or more reservoirs 106 into such flow. The solvent flow can be controlled by a controller of the system so that, for example, the right amount of solvent for a mixture flows to the mixing area 211 before stopping the flow. The controller can be programed to turn the three-way valve 503 to a configuration that allows solvent to flow through it from the solvent reservoirs, or to turn the solvent pump(s) to an on state, or to control any other valves or components of the system for a period of time that allows the proper amount of solvent to flow to the mixing area 211. After that, the controller can be programed to stop the solvent flow and allow the ingredients from the ingredient reservoirs 106 required for the mixture to be dispensed into the solvent flow held in the mixing channel.

After the required ingredients from the ingredient reservoirs are dispensed into the solvent flow held in the mixing channel, the three-way valve 503 can then be switched to a configuration that allows air from the pneumatic system (for example the accumulator chamber) to be forced into the mixing area 211 and therefore agitate and/or push the mixture out of the mixing channel. Furthermore, after the mixture has been moved out of the mixing area, an air blast can be allowed into the mixing area, for example via the three-way valve 503, to remove any left-overs in the mixing channels from the previous mixture before a new mixture is prepared. This can avoid cross contamination in between mixtures. In this way, the air from the pneumatic system can also be used to clean at least part of the device. The cleaning could also include the dispense of a cleaning agent into the mixing channels and the use of the forced air to agitate and drain the cleaned area.

Figure 6:
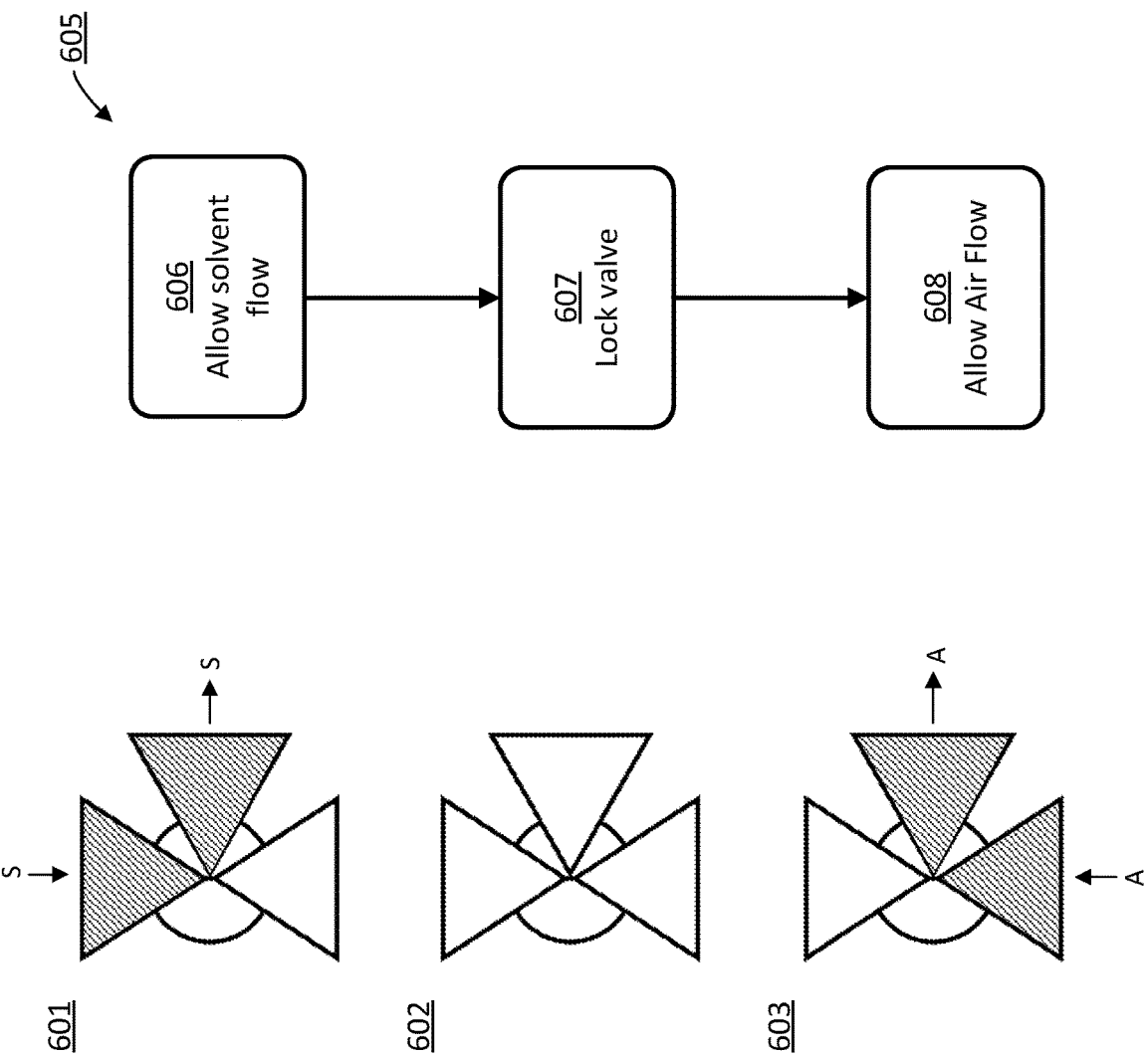
FIG. 6 illustrates a schematic representation and flowchart for a set of methods of operation of a three-way valve, in accordance with specific embodiments disclosed herein.

FIG. 6 illustrates a schematic representation and flowchart for a set of methods of operation of a three-way valve, such as three-way valve 503, in accordance with specific embodiments of the invention. As explained before with reference to FIG. 5, the three-way valve can operate in various configurations. In a first configuration 601, the three-way valve can allow solvent "S" from one or more solvent reservoirs to flow through it to deliver a solvent flow to the mixing area 211. In a second configuration 603, the three-way valve can allow air "A" from the pneumatic system to flow into the mixing area. As explained, the air can be used to move the mixture in the mixing channels, to push the mixture through and out of the mixing channel, and/or to clean the mixing channels.

The three-way valve can have one or more additional configurations, such as a "locked" configuration 602, in which neither solvent nor air flows through it. As explained before, the solvent flow can be stopped and held in the mixing channel when the ingredients from the ingredient reservoirs are being dispensed. During this time, the three-way valve can be in the "locked" configuration. Once the ingredients have been dispensed into the solvent flow, the valve can be switched to configuration 603 so that the air flow moves the mixture through the mixing area. When the three-way valve is in a configuration that does not allow air from the pneumatic system into the mixing area, such as configuration 601 and/or 602, the air from the pneumatic system can be used instead to pressurize the ingredient cartridge via channel 501, as explained with reference to FIG. 5.

Flowchart 605 includes a step 606 of allowing solvent to flow through the valve in a first configuration (such as configuration 601). In this step, solvent can be provided to the mixing area for a mixture. Flowchart 605 further includes the optional step 607 of "locking" the valve to prevent any fluid from passing through the valve. In this step, the solvent flow can be stopped so that solvent provided in step 606 is held in the mixing area while the ingredients from the ingredient reservoirs are dispensed into the solvent flow. Flowchart 605 also includes a step 608 of allowing air to flow in a second configuration (such as configuration 603). In this step, the mixture of solvent and ingredients can be moved through the mixing area, either for agitation or for eventual dispense out of the mixing area. Step 608 can also include allowing air for cleaning the mixing area after the mixture has been dispensed, as described before in this disclosure.

Figure 7:
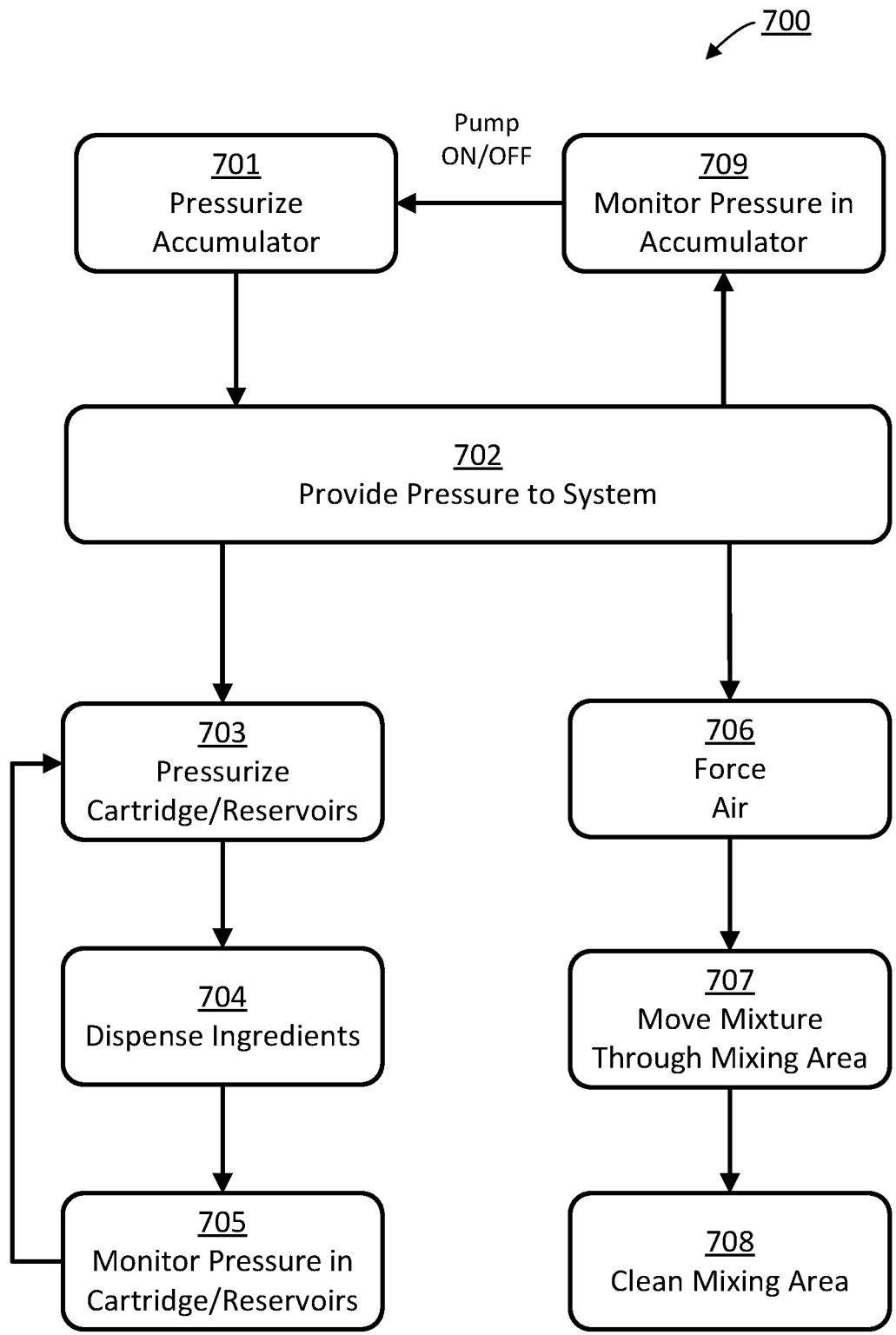
FIG. 7 illustrates a flowchart for a set of methods for a fluid mixture dispensing system, in accordance with specific embodiments disclosed herein.

FIG. 7 illustrates a flowchart 700 for a set of methods in accordance with specific embodiments of the invention. FIG. 7 provides a plurality of methods that can be performed by different elements of the system and at different times. Therefore, certain steps can or cannot be present in all the methods described. The steps of the methods described in FIG. 7 can be individually performed and have been provided in a single flowchart to illustrate the interrelation between the different functionalities that the system can include. However, the order of such steps can be altered and the execution of some of such steps can be omitted according to the method among the set of methods in flowchart 700. All the steps of the method can be performed under the control of one or more controllers in the system by executing instructions stored in memory.

Flowchart 700 starts with step 701 of pressurizing the accumulator chamber. This step can be conducted by the pressure source 301. This step can be preceded by a step of turning the pressure source 301 to an on state. The pressure source can be turned on under the control of a controller of the system. Flowchart 700 continues with step 702 of providing pressure to the system. This step can be conducted by the accumulator chamber once it has been pressurized or while it is being pressurized, in combination with other elements of the systems such as valves, pressure regulator, and the like.

As explained before in this disclosure, the pressure from the accumulator chamber can be used for various purposes in the system. Step 703 indicates the use of the accumulator pressure to pressurize the ingredient cartridge and/or ingredient reservoirs. This step can be conducted via pressure channel 501 described with reference to FIG. 5. Step 706 indicates the use of the accumulator pressure to force air into the mixing area. This step can be conducted via pressure channel 502 described with reference to FIG. 5.

Step 703 can be followed and/or preceded by a step 704 of dispensing one or more ingredients from one or more ingredient reservoirs. As explained before in this disclosure, the dispensing can cause a pressure variation in the pressurized cartridge. Step 705 of monitoring the pressure in the cartridge/reservoirs can be conducted by using one or more sensors such as sensor 407 described with reference to FIG. 4. Step 705 is connected back to step 703 in that these steps can be performed in a loop in order to maintain the pressure in the cartridge/reservoirs stable.

Step 706, on the other side, is followed by a step 707 of moving the mixture through the mixing area and a step 708 of cleaning the mixing area. As described before in this disclosure, these steps can both include the use of the forced air from the pneumatic system through the mixing area. Steps 707 and 708 can be performed individually and/or in any order. In specific embodiments of the invention, the system can first move the mixture through the mixing area and eventually dispense it out of the mixing area, and consecutively clean the mixing area using the forced air. These two steps can be performed with two different air blasts, for example by stopping the forced air after the mixture in dispensed and before the cleaning, or with the same air blast at once.

Flowchart 700 further includes a step 709 of monitoring the pressure in the accumulator chamber. This step can be conducted using one or more sensors such as sensor 405 described with reference to FIG. 4. As illustrated in the flowchart, this step can result in switching the air pump or other pressure source to an ON state to pressurize the accumulator, or to an OFF state to stop pressurizing the accumulator accordingly. As explained before in this disclosure, the pump can be turned to an on state when the pressure in the accumulator drops below a minimum threshold and can be turned off when the pressure in the accumulator reaches a maximum threshold. The results of the monitoring step 709 can be used by a controller to determine if the minimum/maximum threshold has been reached, and to action the pump accordingly. Once the accumulator is pressurized in step 701, the pump can be turned to an off state and the accumulator can provide pressure to the system for the various purposes as indicated by steps 703-708 while the pump is in an off state. When the pressure in the accumulator decreases as detected by step 709, the pump can be turned back on to re-pressurize the accumulator and store more pressure as needed. In specific embodiments of the invention, step 702-708 can be conducted while the accumulator is being pressurized. In other words, the accumulator can also provide pressure to the system when the pump is in an ON state.

Figure 8:
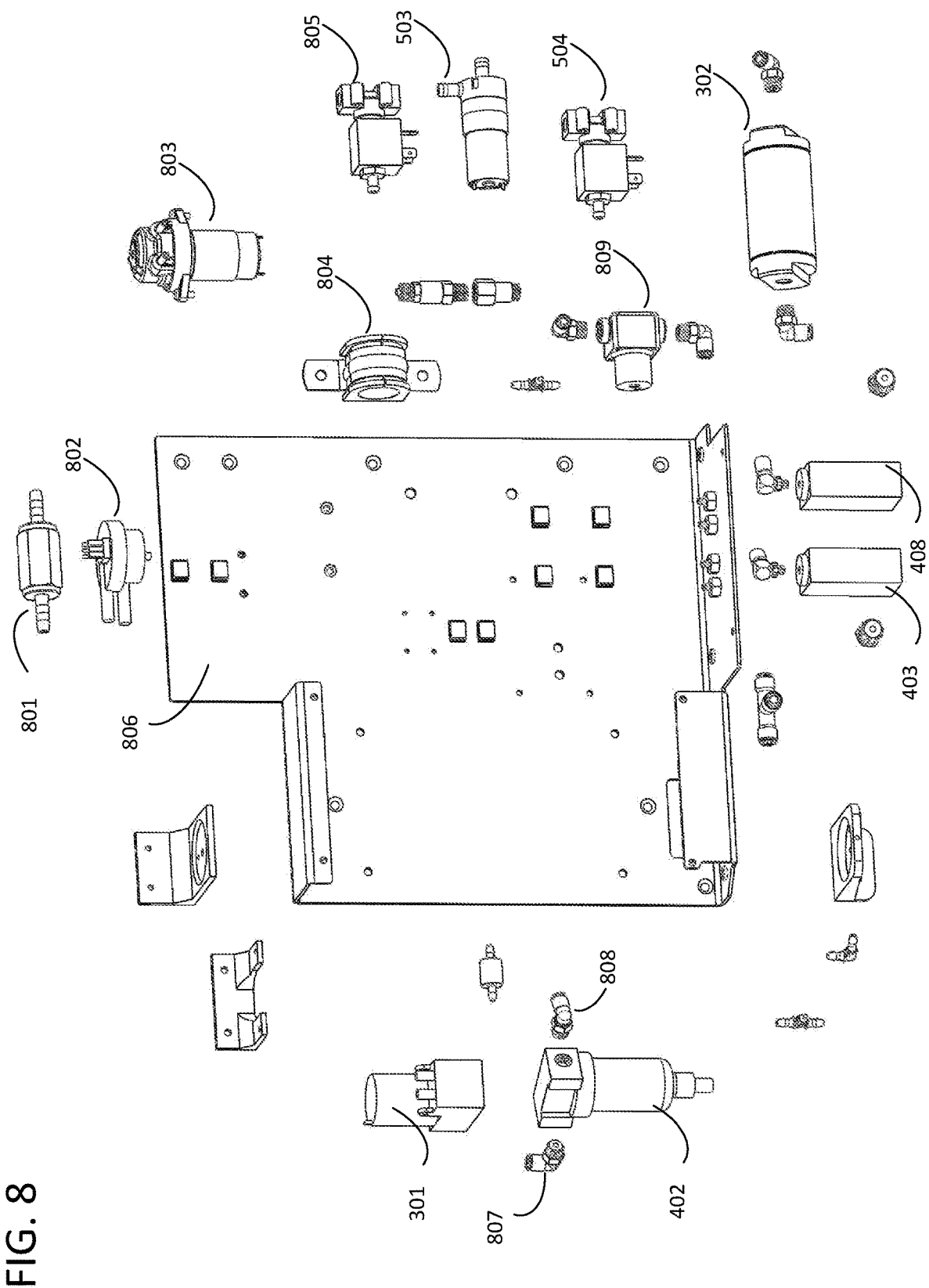
FIG. 8 illustrates an exploded view of some components of the pneumatic system, in accordance with specific embodiments disclosed herein.
Figure 9:
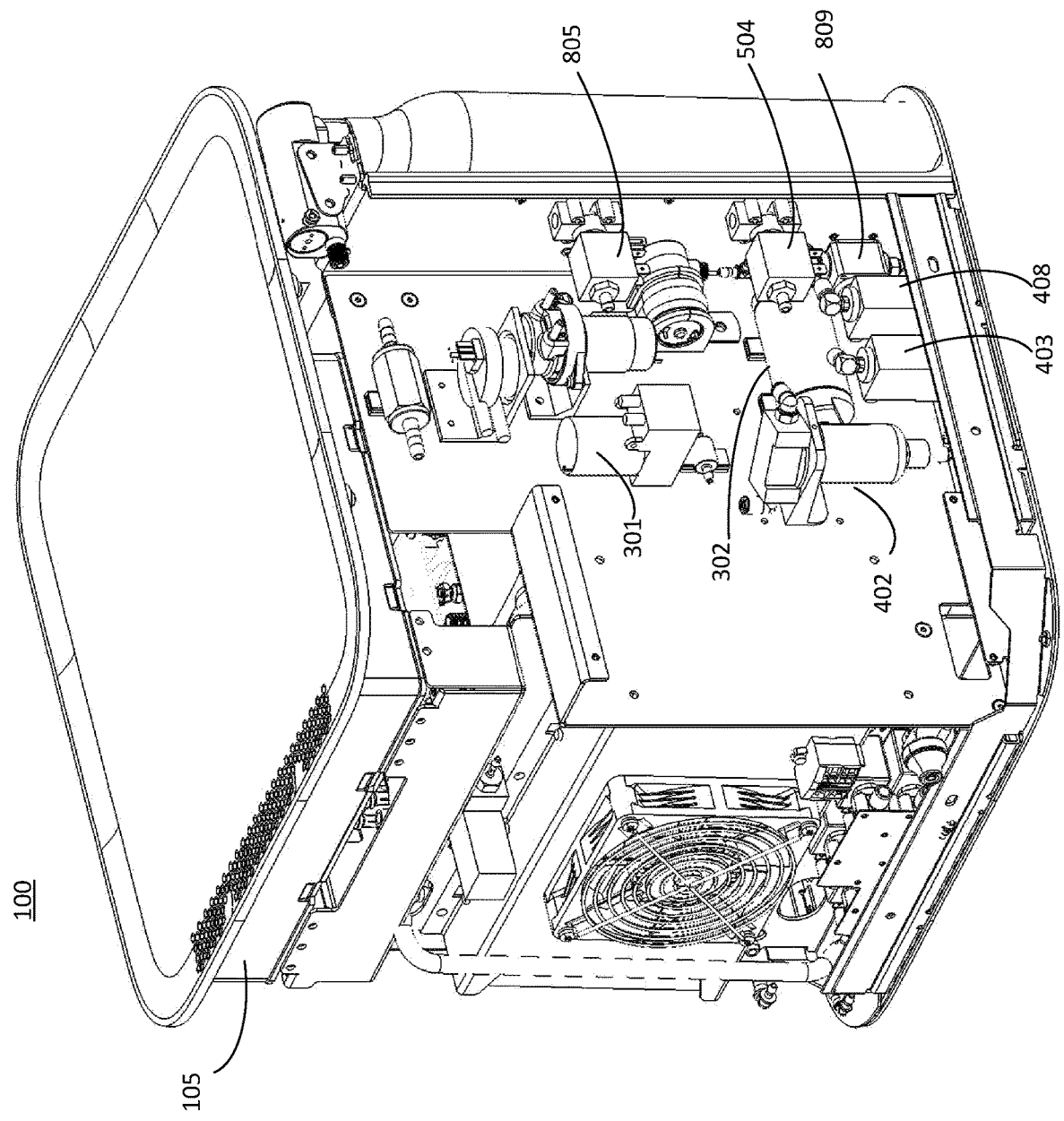
FIG. 9 illustrates the components of FIG. 8 assembled in the fluid mixture dispensing system, in accordance with specific embodiments disclosed herein.

FIG. 8 illustrates an exploded view of the system which illustrates some components of the pneumatic system, in accordance with specific embodiments of the invention. Some of the components described before with reference to FIGS. 1-7 are illustrated in this view. For example, the view illustrates the air pump 301 and the accumulator chamber 302. It is also illustrated the pressure regulator 809, the air filter 402, the valve 403, the valve 408, the three-way valve 503 and the solvent pump 504. Other components of the system are illustrated such as a fluid valve 801, which can be for example a valve of a solvent line, for one of the solvent reservoirs. Flow sensor 802 is also illustrated and can be used in combination with the fluid valve 801 in the solvent line, for example to measure the solvent flow. Pump 803 is also illustrated, and can be a high volume dispense pump such as a sugar pump to dispense sugar for a mixed fluid. An additional three-way valve 805 is also illustrated. This valve can be used in a solvent line as a solvent bypass so that it is possible to dispense a solvent not only to the mixing area but also directly to a final user or other destination, for example in a case where the user wants to dispense water from the device. Other elements in the diagram are connectors, such as pneumatic connectors 807 and 808, and brackets for the components described above, such as bracket 804 for solvent pump 504. All the components can be attached to a panel such as panel 806 and further assembled together with the rest of the components of the fluid mixture dispensing system 100. FIG. 9 illustrates the components of FIG. 8 assembled in the fluid mixture dispensing system, in accordance the specific embodiments of the invention.

As evidenced by the disclosure above, embodiments of the invention that utilize an accumulator chamber as part of the pneumatic system can be advantageous for several reasons. One advantage can be that the accumulator chamber can work like a battery for the system, and store pressure for use when the pressure source is off. In this way, the pressure source does not need to be turned on as often as it would have if the accumulator chamber was not used. On the other hand, by using the air pump in combination with the accumulator chamber, it is possible to automatically restore the pressure in the accumulator chamber as opposed to systems where the pressure source is a pressurized air cylinder that would need to be replaced.

Another advantage is that the accumulator chamber can provide pressure to the system in a more controlled manner, as the pressure from the accumulator chamber can be monitored and regulated before being provided to the system. In this way, the use of an accumulator can facilitate fine precision control over the pneumatic system because it can allow a very low flow rate fixed pressure control of the ingredient cartridge pressure and can also allow a quick heavy blast of air to clear out the mixing area (e.g., mixing channels) of the device.

In specific embodiments of the invention, the valves in the system, such as the set of valves 307 of the ingredient reservoirs, can be electromechanical valves, such as solenoids, and consume power when actioned to dispense the ingredients. In those embodiments, it can be convenient to reserve the power supplied to the system for the actuation of such valves, and other components of the system can be turned off or not used while the valves are being actuated. Because the accumulator stores pressure for the system, the pressure source does not need to be on while the valves are actuated and the power that would otherwise have been consumed by the power source can be saved for the actuation of the valves. In this way, the accumulator can make up for the power fluctuations in the ingredient cartridge caused by the opening of the valves, without needing to use power to feed the pressure source at that critical time. Not only the electromechanical valves but also other power-hungry components of the device can benefit of this feature as the accumulator can be pressurized when those other components are not in use.

In specific embodiments of the invention, dispensing one ingredient from an ingredient cartridge can cause a pressure drop in the ingredient cartridge of about 2-10 kPa. A mixed fluid prepared by the system can include any number of ingredients so the total pressure drop in the ingredient cartridge can vary depending on the mixed fluid. In any case, the accumulator chamber can provide pressure to keep the cartridge pressurize and to provide the air blast to dispense the fluid out of the mixing area. In specific embodiments of the invention, preparing a mixed fluid in the device can cause a pressure drop in the accumulator chamber of about 50-75 kPa. In specific embodiments of the invention, providing the air blast to the system can cause a pressure drop in the accumulator chamber of about 30-70 kPa. In specific embodiments of the invention, the accumulator chamber stores enough pressure to prepare two to three mixed fluids, which can each include dispensing a plurality of ingredients, and forcing air into the mixing area to dispense each mixture and clean in between mixtures, without needing to turn the air pump on.

A controller, as used in this disclosure for example with reference to controller 350, can include one or more processors that can be distributed locally within the system or remotely. For example, one or more components of the system, such as valves, pumps, and sensors can be associated to individual microcontrollers that can control their operations and interaction with other components of the system. In specific embodiments of the invention, the controller can be a control system for the overall device even if the various control elements are separately programmed and are not part of a common control hierarchy. The controller can have access to one or more memories that store the instructions for the controllers. The memories can also store information for the system, such as a library of recipes, reference values such as the pressure thresholds and/or target pressure values mentioned in this disclosure, and any other necessary information such as sensor data and the like.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method disclosed herein can be executed by a processor in combination with a computer readable media storing instructions for the methods in combination with the other hardware elements described above. These and other modifications and variations to the present invention may be practiced by those skilled in the art, without departing from the scope of the present invention, which is more particularly set forth in the appended claims.

What is claimed is:

1. A fluid mixture dispensing device comprising:
   a set of pressurized ingredient reservoirs containing ingredients;
   a mixing area configured to receive at least one ingredient from the set of pressurized ingredient reservoirs;
   a set of dispensing valves configured to dispense, into the mixing area, ingredients from the set of pressurized ingredient reservoirs;
   a pressure source;
   an accumulator chamber configured to supply pressure to the set of pressurized ingredient reservoirs and to force air through the mixing area;
   a pressure sensor configured to measure pressure in the set of pressurized ingredient reservoirs; and
   a controller programmed to:
   pressurize the accumulator chamber using the pressure source;
   receive measurements from the pressure sensor;
   set, based on the measurements from the pressure sensor and using the accumulator chamber, a pressure for the set of pressurized ingredient reservoirs;
   dispense, using at least one dispensing valve in the set of dispensing valves, the at least one ingredient from the set of pressurized ingredient reservoirs into the mixing area; and
   force air into the mixing area using the accumulator chamber.

2. The fluid mixture dispensing device of claim 1, wherein:
   the controller is further programmed to force the air into the mixing area to dispense the at least one ingredient out of the mixing area.

3. The fluid mixture dispensing device of claim 1, wherein:
   the controller is further programmed to force the air into the mixing area to clean the mixing area.

4. The fluid mixture dispensing device of claim 1, wherein:
   the accumulator chamber provides pressure to the set of pressurized ingredient reservoirs via a first channel;
   the accumulator chamber provides pressure to the mixing area via a second channel; and
   the first channel and the second channel are different.

5. The fluid mixture dispensing device of claim 4, further comprising:
   a set of valves;
   wherein:
   the first channel comprises at least one valve, from the set of valves, exclusive to the first channel;
   the second channel comprises at least one valve, from the set of valves, exclusive to the second channel; and
   the first channel and the second channel comprise at least one valve, from the set of valves, common to both the first channel and the second channel.

6. The fluid mixture dispensing device of claim 1, further comprising:
   a set of valves;
   at least one solvent reservoir; and
   a three-way valve between the at least one solvent reservoir and the mixing area;
   wherein the three-way valve is in the set of valves; and
   wherein the controller is further programmed to force air into the mixing area using the three-way valve.

7. The fluid mixture dispensing device of claim 6, wherein:
   the at least one solvent reservoir is connected upstream of the three-way valve;
   the three-way valve moves solvent from the at least one solvent reservoir to a downstream solvent line; and
   the mixing area includes the downstream solvent line.

8. The fluid mixture dispensing device of claim 6, further comprising:
a second solvent reservoir; and
a mixed solvent line configured to receive solvent from the at least one solvent reservoir and the second solvent reservoir;
wherein the mixed solvent line is connected upstream of the three-way valve.

9. The fluid mixture dispensing device of claim 8, wherein:
the three-way valve connects the mixed solvent line to a downstream mixed solvent line, wherein the downstream mixed solvent line is connected downstream of the three-way valve; and
the mixing area includes the downstream mixed solvent line.

10. The fluid mixture dispensing device of claim 1, wherein the mixing area comprises:
a set of mixing channels; and
a solvent inlet line fluidly connected to a solvent reservoir to receive a solvent;
wherein the set of mixing channels receive the at least one ingredient from the set of pressurized ingredient reservoirs as they are dispensed by the pressure in the set of pressurized ingredient reservoirs into the solvent; and
wherein the air forced into the mixing area is forced into the solvent inlet line.

11. The fluid mixture dispensing device of claim 10, wherein:
at least one channel in the set of mixing channels is configured to receive at least two different ingredients from at least two different ingredient reservoirs in the set of pressurized ingredient reservoirs.

12. The fluid mixture dispensing device of claim 1, wherein:
the set of dispensing valves comprises at least one electromechanical solenoid;
the at least one ingredient is dispensed from the set of pressurized ingredient reservoirs via the at least one electromechanical solenoid.

13. The fluid mixture dispensing device of claim 12, further comprising:
a set of valves;
wherein:
the pressure source is off when the at least one ingredient is dispensed from the set of pressurized ingredient reservoirs; and
the controller is programmed to operate the set of valves to use the accumulator chamber to control the pressure in the set of pressurized ingredient reservoirs when the at least one ingredient is dispensed from the set of pressurized ingredient reservoirs using the at least one electromechanical solenoid.

14. The fluid mixture dispensing device of claim 1, further comprising:
an inlet valve;
wherein the set of pressurized ingredient reservoirs are in a pressurized cartridge;
and
wherein the controller is further programmed to:
set the pressure in at least one ingredient reservoir in the set of pressurized ingredient reservoirs using the inlet valve.

15. The fluid mixture dispensing device of claim 14, wherein the controller is further programed to:
open the inlet valve when the pressure in the at least one ingredient reservoir has reached a first level; and
close the inlet valve when the pressure in the at least one ingredient reservoir has reached a second level;
wherein the inlet valve receives pressure from the accumulator chamber.

16. The fluid mixture dispensing device of claim 1, wherein:
dispensing a fluid mixture by the fluid mixture dispensing device causes a pressure drop in the set of pressurized ingredient reservoirs; and
the accumulator chamber stores pressure to pressurize the set of pressurized ingredient reservoirs to dispense at least two fluid mixtures without using the pressure source.

17. A fluid mixture dispensing device comprising:
a set of pressurized ingredient reservoirs containing ingredients;
a mixing area;
a set of dispensing valves configured to dispense ingredients from the set of pressurized ingredient reservoirs;
a pressure source;
at least one solvent reservoir;
an accumulator chamber pressurized by the pressure source;
a solvent pump;
a pressure sensor configured to measure pressure in the set of pressurized ingredient reservoirs;
a three-way valve fluidly connected to the at least one solvent reservoir, the mixing area, and the pressure source;
wherein the accumulator chamber pressurizes the set of pressurized ingredient reservoirs based on measurements from the pressure sensor;
wherein at least one dispensing valve in the set of dispensing valves dispenses at least one ingredient from the set of pressurized ingredient reservoirs into the mixing area;
wherein the solvent pump moves a solvent from the at least one solvent reservoir towards the three-way valve; and
wherein the accumulator chamber forces air, through the three-way valve, to the mixing area and thereby moves the solvent through the mixing area.

18. The fluid mixture dispensing device of claim 17, wherein the three-way valve:
allows the solvent from the at least one solvent reservoir to flow to the mixing area in a first configuration; and
allows air from the accumulator chamber to flow to the mixing area in a second configuration.

19. The fluid mixture dispensing device of claim 17, further comprising:
a second solvent reservoir; and
a mixed solvent line configured to receive solvent from the at least one solvent reservoir and the second solvent reservoir;
wherein the mixed solvent line is connected upstream of the three-way valve.

20. The fluid mixture dispensing device of claim 17, wherein the mixing area comprises:
a set of mixing channels; and
a solvent inlet line fluidly connected to the at least one solvent reservoir to receive a solvent flow;
wherein the set of mixing channels receive at least one ingredient from the set of pressurized ingredient reservoirs as they are dispensed into the solvent flow; and
wherein the accumulator chamber moves the solvent flow through the mixing area by forcing air via the solvent inlet line.

21. The fluid mixture dispensing device of claim 20, wherein:
  at least one channel in the set of mixing channels is configured to receive at least two different ingredients from at least two different ingredient reservoirs in the set of pressurized ingredient reservoirs.

22. The fluid mixture dispensing device of claim 20, wherein:
  the at least one ingredient is dispensed from the set of pressurized ingredient reservoirs via at least one electromechanical solenoid.

* * * * *